Figure 1:
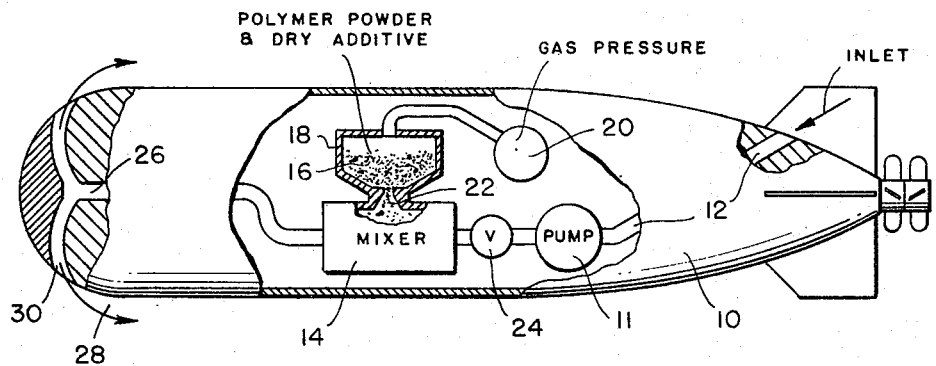

Nov. 22, 1966   R. G. THOMPSON ET AL   3,286,674
SOLUBILITY ACCELERATION ADDITIVE FOR MIXING
NON-NEWTONIAN FLUIDS
Filed March 17, 1965

INVENTORS.
ROBERT G. THOMPSON
ROBERT K. GOTTFREDSON

BY V. C. MULLER
ATTORNEY.

3,286,674
SOLUBILITY ACCELERATION ADDITIVE FOR MIXING NON-NEWTONIAN FLUIDS
Robert G. Thompson, Los Angeles, and Robert K. Gottfredson, Altadena, Calif., assignors to the United States of America as represented by the Secretary of the Navy
Filed Mar. 17, 1965, Ser. No. 440,649
5 Claims. (Cl. 114—67)

The invention described herein may be manufactured and used by or for the Government of the United States of America for governmental purposes without the payment of any royalties thereon or therefor.

This invention relates to underwater vehicles, such as torpedoes, submarines and the like, and more particularly to improvements in propulsion by use of drag reducing liquids which are applied to the water boundary layers of their hulls.

There are, at present, certain systems under development for continuously ejecting so called non-Newtonian fluids into the boundary layer surrounding an underwater vehicle, such as a torpedo, which are known to reduce skin friction drag and thus produce improved performance of the vehicle. Such fluids are composed of a polymer which is hydrated in water to form a somewhat mucilaginous liquid. Known polymers for this purpose are guar gum, a natural polymer, synthetic polymers known as "Seperan" (AP–30), manufactured by Dow Chemical Company, and "Polyox" (WSR 301) manufactured by Union Carbide Corporation, both of which are available in powder form. Only relatively small proportions, by weight, of such polymers, such as of the order of .1%, to water, are required, which thus requires large quantities of water if the drag reducing liquid is to be employed throughout the entire torpedo run. Since the spatial requirements of a torpedo prohibit carrying such quantities of water, a recent development utilizes sea water which is inducted by a pump to which is added the polymer, the resultant liquid then being delivered to the nose of the torpedo for ejection into the boundary layer. Since the difficulties of completely hydrating the particles in a very short time have been recognized, one solution to the problem has been proposed in which the polymer is premixed with a liquid to form a slurry which is metered into the induced sea water in a mixing chamber. Slurries of such type, however, are not entirely stable and polymer particles may settle out of the liquid in which they are dispersed. It becomes apparent, accordingly, that if the polymer could be delivered to a mixing chamber in a powdered form considerable advantage would obtain.

It is known that such polymer powders can be added directly to water and be completely hydrated under laboratory conditions in which the turbulence of the water in a mixing chamber and rate and feed of the powder are properly controlled. The rate at which complete hydration occurs, however, is generally insufficient for producing the amount of drag reducing liquid required for an underwater vehicle, such as a torpedo.

One of the objects of the invention is to provide a polymer supply, within a torpedo, which is mixed with a dry additive, which additive promotes rapid dispersion and hydration of the polymer particles and eliminates lumping of the particles in the water.

Another object is to provide a novel method of producing a drag reducing liquid.

Figure 2:
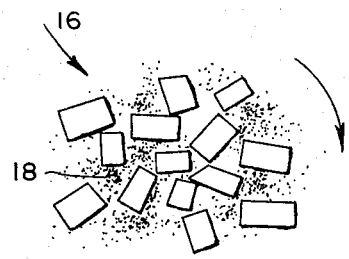

Further objects, advantages, and salient features will become apparent from the description to follow, the appended claims, and the accompanying drawing, in which:

FIG. 1 diagrammatically illustrates a torpedo employing the subject of the invention, and FIG. 2 illustrates a mixing process.

Referring to the drawing, torpedo hull 10, of any conventional outer shape, such as a curve of revolution, is provided internally with a pump 11 which induces sea water through conduit 12 and delivers it to a mixing chamber 14 to which is delivered a mixture 16 of polymer particles and additive particles, contained in a supply chamber 18 which is pressurized by a gas source 20, such as nitrogen. A metering orifice 22 controls the rate of feed of the particles to the mixing chamber and the rate of the feed of sea water may be controlled by a variable speed pump or a metering valve 24. The outlet from the mixing chamber is connected by a conduit 26 which delivers the liquid to the boundary layer 28 through a plurality of angular spaced apertures 30. The liquid, in sheath form surrounding the torpedo, then mingles with ambient water passing adjacent the boundary layer in known and conventional manner. The general arrangement of parts described form no part of the invention, and are described only to point out the environment of the invention.

The mixing chamber may be of any type desired which will produce high turbulence of the sea water and thus disperse the fed particles rapidly.

Various additives to the polymer particles have been employed but it has been discovered that ordinary granular table sugar yields satisfactory results. The polymer has been ground to about 120 mesh and mixed with the sugar in the proportion of one part by weight of sugar to two parts by weight of polymer. The polymers employed were the two synthetic polymers referred to with Seperan yielding satisfactory results. The percentage by weight of the polymer particles to water may be of the order of .1%.

The action which takes place during hydration of the polymer is not fully understood, however, it is believed that the dissolving of the sugar may provide channels for progressively permitting water to contact and hydrate the polymer particles. In FIG. 2 a small mass of mixed sugar particles 16 and much smaller polymer particles 18 is illustrated which will be assumed to be rapidly moving in the turbulent water. As will be apparent, the outermost particles are in contact with water and are apparently individually separated from the mass by the turbulence thus exposing more unhydrated particles. Simultaneously, the sugar particles are being dissolved, thus providing channels for the water to contact and hydrate additional polymer particles. While this explanation may not be precisely correct, it is known that rapid dispersion of the polymer particles does occur which, if not mixed with the sugar, would not occur since a mass of dry polymer particles, only, tends to wet or hydrate the outermost particles leaving the center mass of particles in a dry state.

The chemical formulas of the synthetic polymer particles referred to are:

Seperan

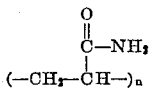

Polyox

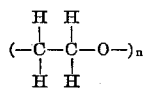

Obviously, many modifications and variations of the present invention are possible in the light of the above teachings. It is therefore to be understood that within the scope of the appended claims the invention may be practiced otherwise than as specifically described.

What is claimed is:

1. Apparatus for delivering a liquid to the boundary layer of a water vehicle which will reduce the vehicle drag, comprising:
   (a) a supply chamber carried within the vehicle containing a mixture of particles, said particles being granulated table sugar and polymer particles which, when hydrated, have the drag reducing characteristics of Seperan or Polyox;
   (b) said supply comprising, by weight, 50% to 75% of the polymer particles and of a size not to exceed about 120 mesh, said sugar particles comprising the remainder;
   (c) a mixing chamber to which ambient water is continuously delivered in a turbulent flow;
   (d) means for metering said mixture to the water to provide a drag reducing liquid having, by weight, about .1% of polymer,
   (e) and means for delivering the resultant liquid to the boundary layer of the vehicle.

2. Apparatus in accordance with claim 1 including a gas source for pressurizing said chamber for effecting flow of the mixed particles to the mixing chamber.

3. The process for delivering a liquid to the boundary layer of a water vehicle which will reduce the vehicle drag, comprising:
   (a) continuously inducting ambient water into the vehicle and moving it in a turbulent flow through a mixing locus,
   (b) metering a mixture of dry particles into the mixing locus, the particles comprising granulated table sugar and polymer particles interspersed therein which, when hydrated, have the drag reducing characteristics of Seperan or Polyox, the polymer particles being in proportion, by weight, of 50% to 75% of the mixture, and of a size not to exceed about 120 mesh, the sugar particles comprising the remainder, the rate of metering of the mixture being such as to provide a drag reducing liquid having, by weight, about .1% of polymer, and
   (c) delivering the resultant liquid to the boundary layer of the vehicle.

4. The process in accordance with claim 3 wherein the polymer particles are Separan and the sugar particles comprise 25% to 33⅓% of the weight of the mixture.

5. The process in accordance with claim 3 wherein the polymer particles are Polyox and the sugar particles comprise 33⅓ to 50% of the weight of the mixture.

References Cited by the Examiner

UNITED STATES PATENTS

| | | | |
|---|---|---|---|
| 390,269 | 10/1888 | Vogel | 252—49.3 |
| 559,928 | 5/1896 | Buergermeister | 114—233 |
| 2,733,210 | 1/1956 | Taylor | 252—49.3 |
| 3,016,865 | 1/1962 | Eichenberger | 114—67 |
| 3,196,823 | 7/1965 | Thurston | 114—67 |
| 3,205,846 | 9/1965 | Lang | 115—67 |
| 3,230,919 | 1/1966 | Crawford | 114—67 |

References Cited by the Applicant

UNITED STATES PATENTS

| | | |
|---|---|---|
| 541,451 | 6/1895 | Yorke. |
| 744,622 | 11/1903 | Ross et al. |

FERGUS S. MIDDLETON, *Primary Examiner.*

ANDREW H. FARRELL, *Examiner.*